United States Patent
Sundahl et al.

[11] Patent Number: 6,094,215
[45] Date of Patent: *Jul. 25, 2000

[54] METHOD OF DETERMINING RELATIVE CAMERA ORIENTATION POSITION TO CREATE 3-D VISUAL IMAGES

[75] Inventors: Robert C. Sundahl; Randy R. Dunton, both of Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,389

[22] Filed: Jan. 6, 1998

[51] Int. Cl.[7] .......................... H04N 13/02; H04N 15/00
[52] U.S. Cl. ................... 348/42; 348/46; 348/50; 348/155
[58] Field of Search ................ 348/42, 46, 50, 348/135, 142; 702/150, 151, 152, 153, 155, 158; H04N 13/02, 15/00

[56] References Cited

U.S. PATENT DOCUMENTS

| | | | |
|---|---|---|---|
| 4,138,196 | 2/1979 | Redman | 356/350 |
| 4,727,471 | 2/1988 | Driels et al. | 364/167 |
| 4,754,327 | 6/1988 | Lippert | 348/42 |
| 4,815,819 | 3/1989 | Mayhew et al. | 350/144 |
| 4,895,431 | 1/1990 | Tsujiuchi et al. | 348/75 |
| 4,993,836 | 2/1991 | Furuhashi et al. | 348/42 |
| 5,262,867 | 11/1993 | Kojima | 348/232 |
| 5,267,042 | 11/1993 | Tsuchiya et al. | 358/209 |
| 5,283,640 | 2/1994 | Tilton | 348/42 |
| 5,604,529 | 2/1997 | Kuga et al. | 348/46 |
| 5,659,195 | 8/1997 | Kaiser et al. | 257/415 |
| 5,678,089 | 10/1997 | Bacs, Jr. et al. | 348/42 |

OTHER PUBLICATIONS

Overview of MEMS Activities in the U.S. by C.H. Mastrangelo, Cnt. for Integrated Sensors and Circuits Dept. of Elec. Eng. and Comp. Science, U. of Mich., Ann Arbor, MI 48109–2122, U.S.A. pp. 1–10.

*Primary Examiner*—Bryan Tung
*Assistant Examiner*—Nhon T Diep
*Attorney, Agent, or Firm*—Blakely, Sokoloff, Taylor & Zafman LLP

[57] ABSTRACT

A system for generating a three-dimensional image is described. The system includes a camera which records a first image of a first location and a second image of a second location. A motion detector detects the motion of the camera to compute a position of the camera corresponding to the first location and a second position corresponding to the second location. A processor uses the first and second image and the first and second location to generate a three-dimensional image.

16 Claims, 4 Drawing Sheets

METHOD OF DETERMINING RELATIVE CAMERA ORIENTATION POSITION TO CREATE 3-D VISUAL IMAGES

BACKGROUND OF THE INVENTION

(1) Field of the Invention

The present invention relates generally to generating three-dimensional images. More particularly, the present invention relates to using motion detectors or accelerometers to determine movement and position of a camera and combine this information with multiple images taken by the camera to generate a 3-D image.

(2) Related Art

Photographic and imaging systems today are primarily designed for use in recreating two-dimensional images. In a two dimensional image, only one perspective is needed. This perspective may be generated by positioning a camera at a fixed position and recording the image on photographic film or on electronic sensors. However, human vision is stereoscopic. Thus, the human brain combines two images, each image reaching one eye. The brain combines the two images to generate an additional dimension of depth to create a three dimensional (3-D) image. In recent years, cameras and electronic sensors have been designed to try to take two images and recombine them to reproduce a three dimensional image with a depth component.

Traditional three dimensional imaging systems utilized two cameras. Preferably, the relationship between the two cameras was fixed. Thus, when the two perspectives (one perspective from each camera) were recombined, the information relating the two perspectives was known because of the fixed relationship between the two cameras. The problem with using two cameras is that it is more expensive than a single camera arrangement. Two cameras typically require two lenses, two camera bodies, and two sets of film.

Alternative systems for generating 3-D images have been implemented using two lenses in one camera body. These systems are still more expensive than standard two-dimensional cameras because multiple systems of lenses are needed to create multiple images. Each lens system generates an image corresponding to a different perspective view of the subject being photographed. Furthermore, placing two lens systems in a single camera body, requires that the lens systems be placed in close proximity to each other. The close proximity of the two systems of lenses results in less depth perception than would be available if the lens systems could be placed further apart.

Alternate embodiments of generating a 3-D image are possible using mirrors and prisms. However, such systems are bulky and complicated. Thus, it is desirable to design a system which can quickly and easily generate multiple images for combination into a single 3-D image. Such a system will be described in the following application.

BRIEF SUMMARY OF THE INVENTION

A system for generating a three-dimensional image is described. The system includes an imaging apparatus configured to record a first image at a first location and a second image at a second location. A motion sensor detects movement of the imaging apparatus from the first location to the second location. A processor is configured to generate a three-dimensional image from the first image, the second image and an output of the motion sensor.

DETAILED DESCRIPTION OF THE INVENTION

In the following description, a system for using a single camera with a single lens system to generate three dimensional images will be described. The camera will include a set of motion sensors, preferably a micro-machined silicon ("MEMS") sensor, which detects linear and rotational acceleration or movements of the camera, and thereby can compute displacement of the camera to determine positions at which a camera is located. Alternately a global positioning ("GPS") system may be used to determine location. Another type of motion sensor which may also be used are vibrating MEM sensors or commercially available laser gyros. Using the position information and the at least two images taken by the single lens system, the camera or an external processor can recreate a three dimensional image representing a subject.

In the accompanying description, certain descriptions will be provided to facilitate understanding of the invention. For example, the specification will describe the invention using certain MEMS sensor types such as micro-machined accelerometers. However, it is recognized that other position sensors or motion detectors may be used. In particular, GPS systems and other types of MEMS may be appropriate. The actual sensor used will depend on the cost of the sensor, whether a sensor can provide data with sufficient accuracy, the power consumption of the sensor, and the size of the sensor. The included details are provided to facilitate understanding of the invention, and should not be interpreted to limit the scope of the invention.

Figure 1:
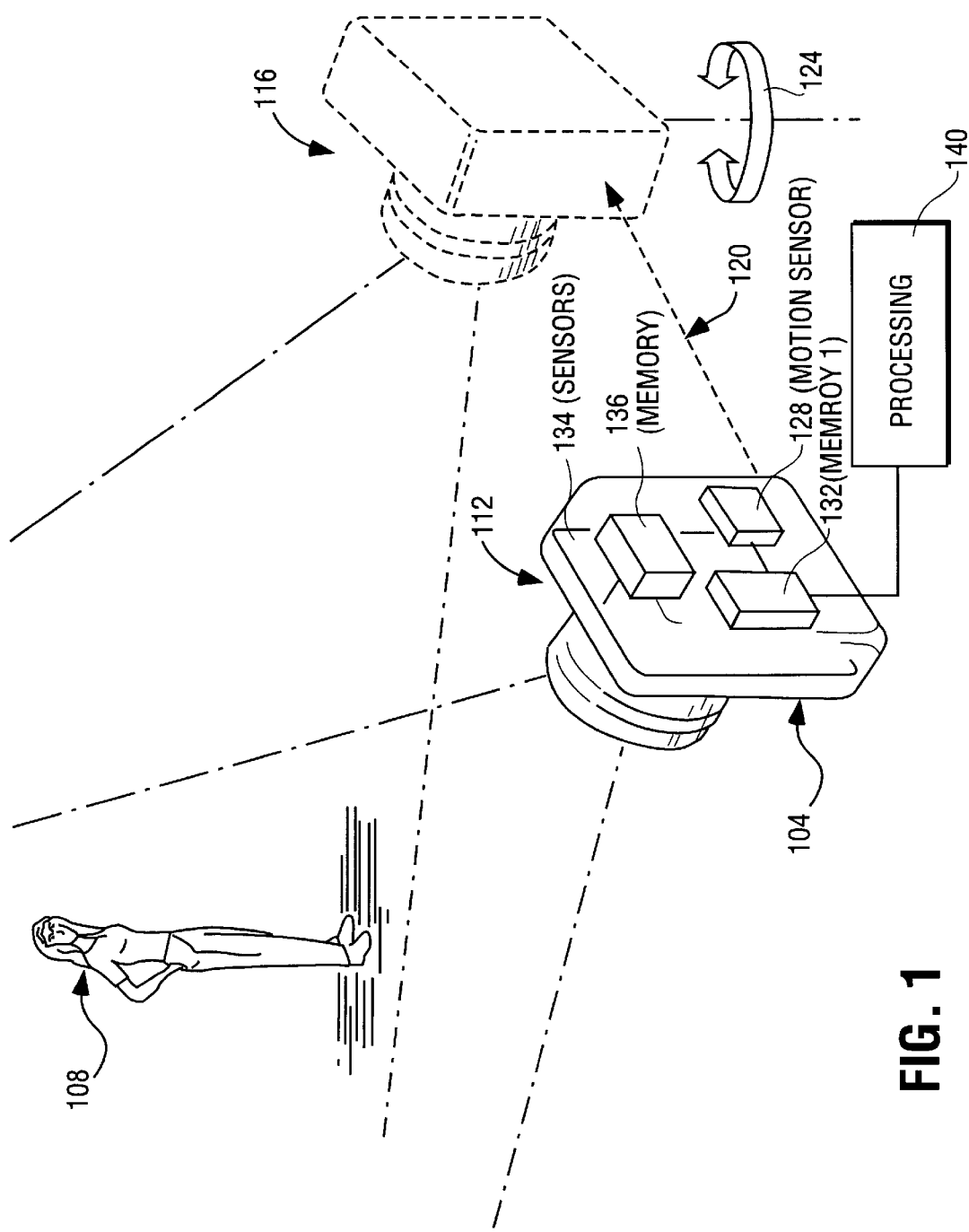
FIG. 1 illustrates one embodiment of the invention for generating a three-dimensional image.

An operation of the overall system is illustrated in FIG. 1. In FIG. 1, a camera 104 is used to generate a three dimensional image of a subject 108. The camera is in an initial position 112 when the first image is taken. After the first image is taken, the camera is moved to a second position 116. The movement includes both a lateral translation illustrated by arrow 120 and may include a rotation motion illustrated by arrow 124. In one embodiment, a motion sensor 128 within the camera detects the lateral translation and the rotation of the camera. In one embodiment, motion sensor 128 includes two MEMS sensors, one MEMS sensor which detects lateral acceleration 120 and a second MEMS sensor to detect rotation. In one alternative embodiment, GPS sensors may be used to determine the position of the camera.

In a preferred embodiment, MEMS sensor 128 is an inertial sensor. Such sensors are based on comb drive actuator technology developed by Howe and described in an article entitled "Laterally Driven Polysilicate Resident Micro structures", by W. C. Tang, T. C. Nguyen and R. T. Howe, proceedings IEEE Microelectromechanical Systems Workshop, Salt Lake City, Utah, U.S.A., February, 1989, pages 53–59. An example of an appropriate accelerometer is a 50N1G accelerometer from Analog Devices. Analog Devices also produces integrated BiCMOS devices merged with a micro machine sensor for determining device rotation. These sensors are being used in advanced automotive braking systems. These sensors are being commercialized by General Motors and are described in the article "Overview Of MEMS Activities In The U.S." by C. H. Mastrangelo who is with the Center for Integrated Sensors and Circuits, Department of Electrical Engineering, University of Michigan, Ann Arbor, Mich., 48109. The article from Mastrangelo also describes alternative embodiments of motion sensors, including optical actuators which may be used to determine the motion of a camera. By integrating the acceleration of the camera, a velocity can be developed. A second integration of the velocity generates a displacement of the camera. This displacement information may be used to determine a second position 116 of a camera 104 when the second image is taken with respect to the first position 112 and orientation of the camera 104.

The relative orientations and positions of the camera, including both the first position 112 and the second position 116, are recorded either in a memory device 132 in the camera, or in an alternative embodiment, the data may be stored in an external memory coupled to the camera. Some motions sensors, such as sensors which measure acceleration may not produce position data. In these embodiments, data describing the motion of the camera, such as acceleration data, may be recorded in memory. At a later time, a processor uses the motion data to compute position data. The respective motion or position and orientation data are organized to allow correlation of each image recorded with a corresponding position, such as first position 112 or second position 116.

Each image recorded may be recorded on photographic film, or more preferably, using electronic sensors 134. In one embodiment, the electronic sensors are Complementary Metal Oxide Semiconductor (CMOS) sensors. In alternate embodiments, photo sensing charge couple device arrays ("CCD") or photo-diodes may be used. The electronic image output by the electronic sensors are stored in a second memory device 136. If the image was recorded on photographic film, the image is converted to an electronic form for further processing. The conversion may be accomplished using a scanner or other methods of converting chemical or light data to electronic data. Such scanners are commercially available from several vendors, including Hewlett Packard of Palo Alto, Calif. The digital image is stored in memory device 136.

In order to create a single three dimensional image from the two images of one subject, a processing unit 140 retrieves the images and the corresponding position and orientation information and recombines them into a single, three-dimensional image. The processing unit 140 may be implemented in a graphics processor card. In another embodiment, the processor is a general microprocessor executing a program to handle graphics processing functions. Various methods of processing two images to generate one 3-D image are described in Masatoshi Okutomi and Takeo Kanade, A Multiple-Baseline Stereo, IEEE Transactions on Pattern Analysis and Machine Intelligence, Vol. 15, No. 4, April 1993.

Figure 2:
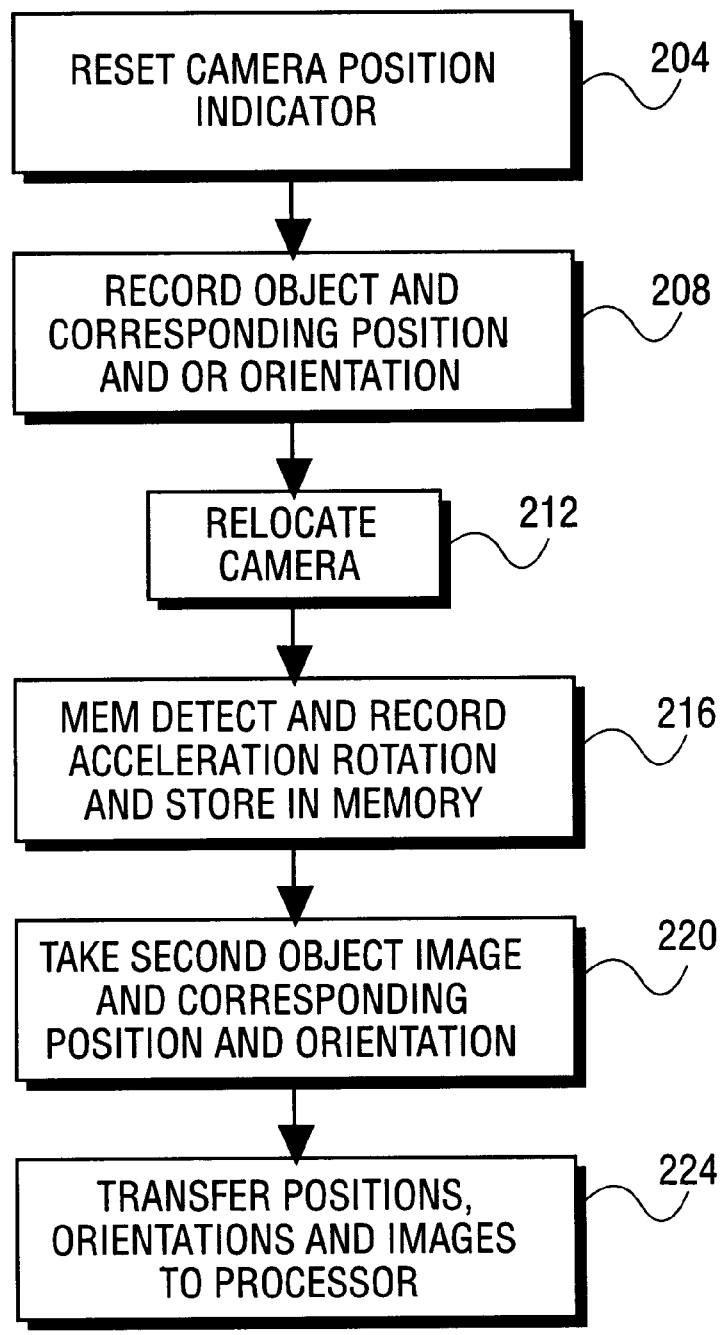
FIG. 2 is a flow diagram describing the process of generating two images.

FIG. 2 illustrates a flow chart describing the steps used to create a 3-D image from the camera of FIG. 1. In step 204, before the first image is taken, the user resets a camera position indicator. The resetting of the camera position indicator preferably clears the memory 132 storing output of the motion sensor, such that the first image recorded in a sequence is preferably at a zero point reference frame. The camera records an image of a subject at the zero point reference frame in step 208. At approximately the same time as the recording of the first image occurs, a corresponding position and orientation of the camera is recorded in memory 132. In the camera of FIG. 1, a CCD array generates the image stored in the second memory 136 of FIG. 1.

After the camera has recorded the first image and corresponding position and orientation information, the camera is relocated in step 212. The relocation may involve both a lateral translation 120 and rotational movement 124. Either a person or a motor driven apparatus may move the camera. In one embodiment, the camera is moved along a track, minimizing rotational movements and allowing embodiments of the camera which do not measure camera orientation. During the relocation, a sensor, preferably a MEMS sensor, records the motion and rotation of the device in step 216. In one embodiment of the invention, the MEMS sensor records acceleration and integrates the acceleration to generate a displacement. The recorded acceleration, rotation or displacement information is stored in a memory device.

When the camera has reached a second position, the camera records a second image of the subject. As the second image is recorded, the camera uses information from the motion sensor and records a camera position and orientation corresponding to the second image. The position and orientation information is stored in a position and orientation memory device 132. The second image and the first image must have a sufficient amount of subject matter overlap so that the processor will be able to reconstruct the overlapping regions and generate a three dimensional image.

The prior sequence of steps 204 through 220 described a system as used in a still camera. It is contemplated that a MEMS or motion sensor may be installed in a video camera and many images taken as the camera moves. Each image corresponds to a set of position data generated from information recorded by the motion sensors. These images may then be reconstructed with neighboring images to allow the recreation of a moving 3-D graphic. The techniques described in the reconstruction of such a moving image are accomplished by repeated iterations of steps 204 through 220 and a series of reconstruction steps executed by the processor. In step 224, the position and orientation information generated by the motion sensor, along with the corresponding recorded images, are transferred to a processor.

Figure 3:
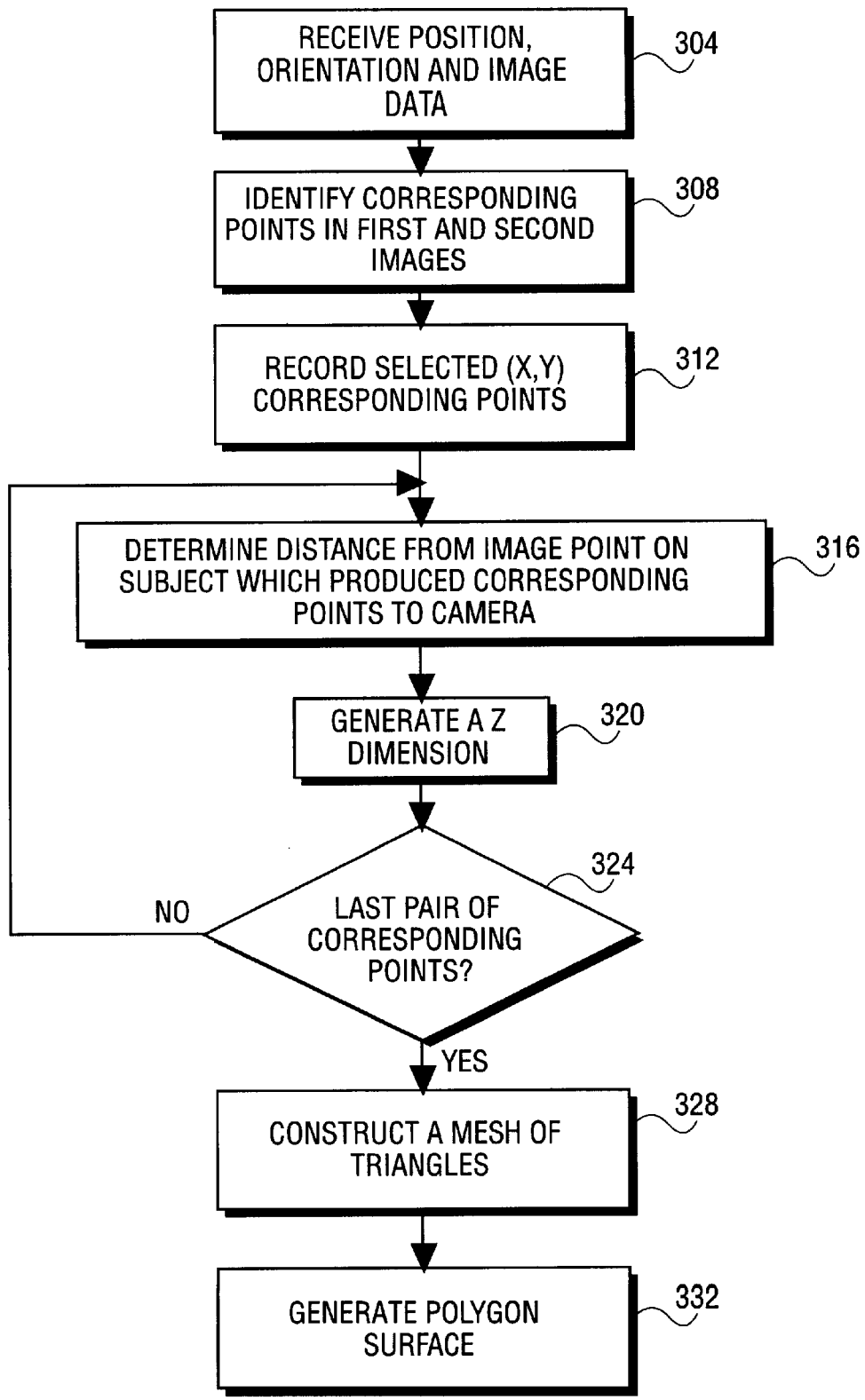
FIG. 3 is a flow diagram describing the process of combining two images to form a single three-dimensional image.

FIG. 3 is a flow diagram describing the steps taken by the processor or processing device 140 to reconstruct a three dimensional image from the two dimensional images and corresponding position and orientation data. In step 304, the processor receives the position and orientation information and the corresponding image data from the camera. The processor then determines corresponding points in the first and second image in step 308. Corresponding points are points in different images or perspectives which correspond to the same point in a subject. Thus, a corresponding point is a point or pixel in the first image which corresponds to a point on the subject, and a second point or pixel in the second image which corresponds to the same point on the subject. For example, the tip of a person's nose may be a corresponding point in both a first and a second image. In one embodiment of the invention, pattern recognition software is used to determine corresponding points. A second, simpler method of determining corresponding points involves an end user, which selects a point in the first image, selects or "clicks" on the first point using a mouse or other pointing device, and selects or "clicks" on the corresponding point in the second image. In step 312, these selected corresponding points and their x,y coordinates are recorded in a memory device. The record is typically a two dimensional record because an x and y coordinate must be recorded for each point.

In step 316, the distance from the camera to an identified point on the subject is determined. The distance may be determined because the first camera position, the second camera position, and the identified image point form a triangle. One side of a triangle represents the distance the camera moved or the distance between the first camera position and the second camera position which is known. Thus, the dimensions of one side of the triangle are known. In addition, the micro sensor sensed the rotation of the camera as the camera moved from the first position to the second position. Thus, the angular displacement of the camera with respect to the subject point is also known. Using trigonometry, the distance between each camera position and the identified image point can be determined to generate a z dimension.

In step 320, the processor generates the third z dimension. The z dimension is related to the coordinate frame chosen. Once an x,y Cartesian coordinate system is chosen, the z dimension is specified and typically normal to the plane of the x,y coordinate system. The z coordinate may be determined using the distance from the image point to the camera, the camera orientation, and the coordinate system chosen. The new x,y,z coordinates for each corresponding pair of coordinates is stored in a field in the memory device associated with the corresponding points.

Steps 316 and 320 are repeated for each pair of corresponding points in the first and second image. After each processing of a pair of corresponding points, the system determines whether the corresponding points previously processed is the last set of corresponding points in an image. If there are more corresponding points to process, the system returns to step 316. When the system has completed a complete set of x,y,z coordinates for every corresponding point in an image, the processor may build a mesh of triangles which do not overlap and which connect the points of all 3-D records into a two dimensional surface in 3-D space. The construction of the mesh triangle may be done using a structured approach of laying out points on a regular grid. The Delaunai algorithm may also be used to reconstruct the mesh triangle. The Delaunai algorithm is well known in the art, and thus will not be described in detail in this application.

In step 332, the processor constructs a database from the x,y,z records and the triangle mesh to describe the 3-D image. The computer may further add descriptions of the surface so that the program can simulate how the subject looks from different angles. In one embodiment of the invention, the processor outputs a description, such as a virtual world ("WRL") file which is a common format for 3-D data on the Internet. 3-D files for use in graphics viewing programs by third party vendors may also be used to display the images. A typical 3-D viewing program is "True Space" by Calligri Company.

The process described in the flowchart in FIG. 3 allows a three dimensional image to be generated from two sets of two dimensional data. The two dimensional data was generated by a camera which took a first image at a first position. Motion sensors detected the movement and rotation or position of the camera as the camera was moved to a second position, where a second image was taken. By processing the image and position information, a processor generated a 3-D image.

The described system reduces costs because less equipment is needed. Specifically, only one lens system is needed. A single lens system makes the system less bulky than prior art 3-D imaging systems. Finally, the system described is suitable for video cameras, in which multiple images are taken. These multiple images may be combined to generate a 3-D image database.

Figure 4:
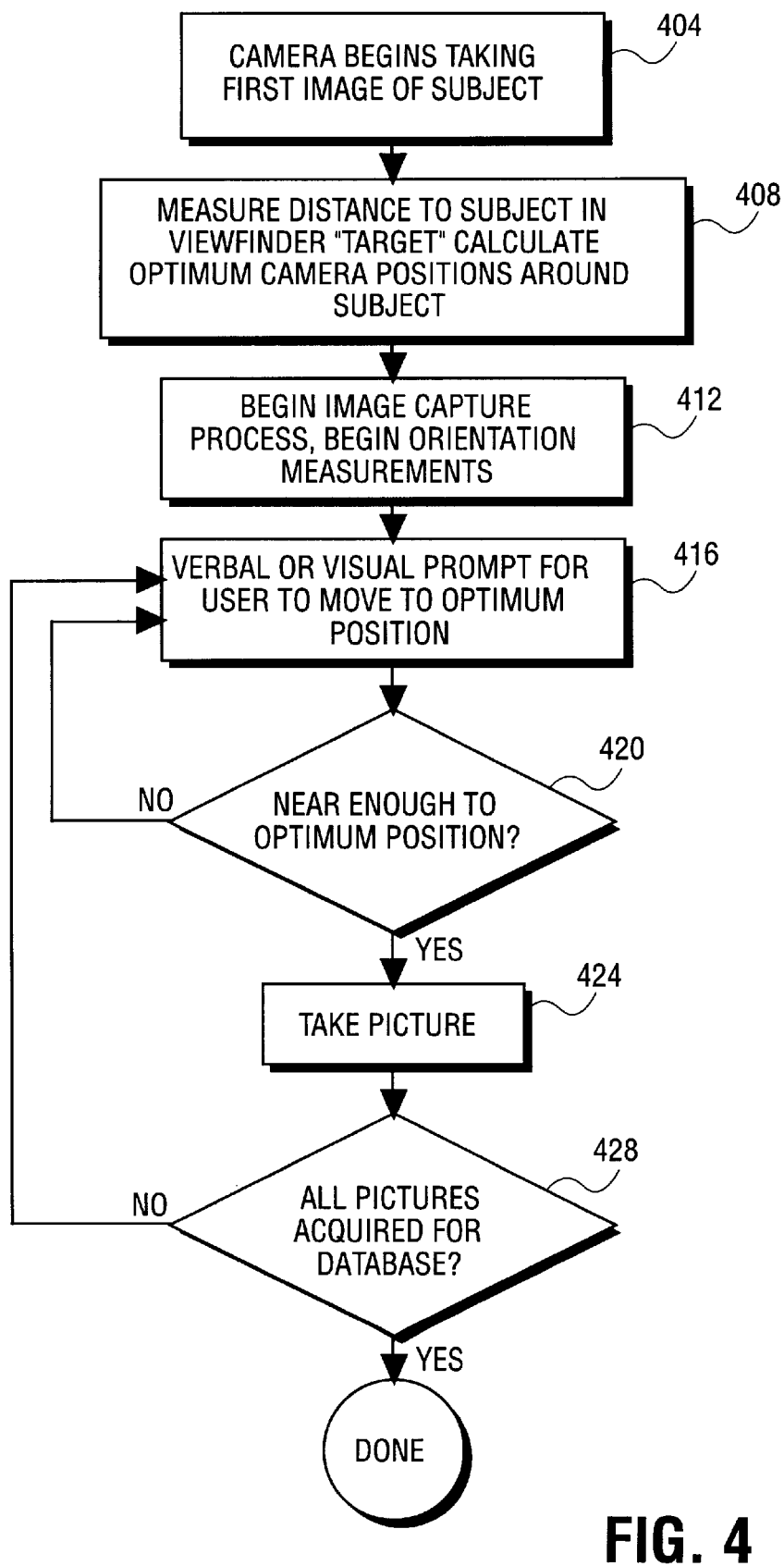
FIG. 4 is a flow diagram illustrating a system to assist a user improve the data gathering capacity of a camera.

The described system may be further refined to improve the ease of use and the data gathering capacity of the camera 104. FIG. 4 is a flow chart describing a method to assist a user improve the data gathering capacity of camera 104. In step 404, the camera takes a first image of a subject from a first location. The camera also measures and records the distance from the subject to the camera "viewfinder" in step 408. The camera may then proceed to compute optimum camera positions from which to take subsequent images. It is preferable that subsequent images for generation of a 3-D image be taken from approximately the same distance around a subject. Thus, a camera would preferably maintain an approximately constant distance from a subject, moving in a circle around the subject.

A number of techniques may be used to determine the distance from the camera to the subject, including using an auto-ranging device. Such an auto-ranging device may use image sensor data, infrared signals or sound signals to determine the distance from the camera to the subject. In an auto-ranging sound signal system, a transmitter in the camera emits a sound pulse. A receiver in the camera detects the reflection of the sound pulse from the subject. The time difference from the emitting of the pulse to the receipt of the sound pulse reflection is used to determine the distance from the camera to the subject.

In step 412, the camera begins an image capture sequence. Orientation measurements are taken to determine the orientation of the camera. Preferably, the orientation of the camera is maintained such that the lens always faces the object.

The camera prompts the user to move in step 416. In one embodiment, the prompts may be given in the form of arrows displayed in the camera viewfinder. The arrows prompt a user to move the camera in a particular direction, or rotate the camera to a particular orientation. The arrows may be displayed using a liquid crystal display (LCD). An auto-ranging device may be used to provide signals to a processor. The processor controls the display to output signals prompting the user to maintain an approximately constant distance from the subject being imaged. In an alternate embodiment, a sound or voice signal may be used to tell the user to move the camera in a particular direction or rotate the camera to a particular orientation. In a preferred embodiment, the prompts or feedback provided to the user via the voice or display assist the user in moving the camera in an approximate circle or sphere around the subject being imaged.

In step 420, the camera determines whether the camera is within a tolerance distance from an optimum position. If the camera is not within the tolerance distance to the optimum position, the camera returns to step 416 prompting the user to further adjust the camera position. If in step 420, it is determined that the camera is within the tolerance distance, the camera records a second or subsequent image of the subject in step 424.

In step 428, the camera determines whether all images necessary for a database have been recorded. The number of images needed is determined by the number of perspectives of the subject desired and the detail of the final 3-D image desired. If additional images are needed, the camera returns to step 416 prompting the user to move to a subsequent position for the recording of a subsequent image. When it is determined in step 428 that a sufficient number of images have been recorded, the camera is done and a 3-D image may be reconstructed.

While certain exemplary embodiments have been described in detail and shown in the accompanying drawings, it is to be understood that such embodiments are merely illustrative of and not restrictive on the broad invention, and that this invention is not to be limited to the specific arrangements and construction shown and described, since various other modifications may occur to those with ordinary skill in the art.

What is claimed:

1. A system for generating a three-dimensional image comprising:
   an imaging apparatus configured to record a first image of a subject at a first location and a second image of the subject at a second location;
   a motion sensor to detect movement of the imaging apparatus from the first location to the second location and record displacement data reflecting the movement of the imaging apparatus, the displacement data including lateral transition data; and
   a processor configured to select corresponding points, which are points on the first and second images that correspond to a same point on the subject, and to generate a three-dimensional image of the subject by combining the first image and the second image using the corresponding points and the displacement data.

2. The system of claim 1 wherein the motion sensor is a MEMS sensor.

3. The system of claim 1 wherein the motion sensor is a global positioning system sensor.

4. The system of claim 1 wherein the motion sensor is a laser gyro.

5. The system of claim 1 wherein the imaging apparatus further comprises:
   a lens system;
   an array of electronic sensors for generating an electronic image.

6. The system of claim 5 wherein the electronic sensors are part of a charge coupled device array.

7. The system of claim 5 wherein the electronic sensors are part of a Complementary Metal Oxide Semiconductor sensor.

8. The system of claim 1 wherein the imaging apparatus is a video camera.

9. A method of generating a three-dimensional image comprising:
   recording a first image of a subject using an imaging apparatus at a first location;
   moving the imaging apparatus to a second location;
   recording sufficient displacement data to determine positions of the imaging apparatus at the first location and the second location, the displacement data including lateral transition data;
   recording a second image of a subject using the imaging apparatus at the second location;
   selecting corresponding points, which are points on the first image and the second image that correspond to a same point on the subject; and
   combining the first image and the second image using the corresponding points and the displacement data to create a three-dimensional image.

10. The method of claim 9 wherein the step of creating a three-dimensional image further comprises:
    computing a z-dimension for each of the corresponding points.

11. The method of claim 9 wherein the step of recording sufficient displacement data to define the first location and a second location after the move further comprises:
    detecting an acceleration; and
    recording the acceleration and time duration of the acceleration to enable a processor to compute a distance.

12. The method of claim 9 wherein the step of recording sufficient displacement data to define the first location and a second location after the move further comprises:
    determining a position using a global positioning system sensor.

13. The method of claim 10 further comprising:
    generating a mesh of triangles to simulate a three-dimensional surface.

14. A method of prompting a user in recording a three dimensional image comprising:
    measuring a distance from a camera to a subject;
    recording a first image of the subject from a first position;
    prompting a user to move to a second position, the second position suitable for taking a second image for use in reconstructing a three-dimensional image of the subject;
    recording sufficient displacement data to compute positions of the imaging apparatus at the first location and the second location, the displacement data including lateral transition data;
    recording the second image of the subject from the second position;
    prompting the user to select corresponding points, which are points on the first and second images that correspond to a same point on the subject; and
    reconstructing a three-dimensional image by combining the first image and the second image using the corresponding points and the displacement data.

15. The method of claim 14 wherein the second position is approximately equidistant from the subject as the first position.

16. The method of claim 14 wherein the recording of the first image and the recording of the second image occurs at two different points in time.

* * * * *